United States Patent [19]

Mueller et al.

[11] 4,189,566

[45] Feb. 19, 1980

[54] POLYMERIZATION OF TETRAHYDROFURAN

[75] Inventors: Herbert Mueller, Frankenthal; Otto H. Huchler, Limburgerhof; Herwig Hoffmann, Frankenthal, all of Fed. Rep. of Germany

[73] Assignee: BASF Aktiengesellschaft, Fed. Rep. of Germany

[21] Appl. No.: 974,118

[22] Filed: Dec. 29, 1978

[30] Foreign Application Priority Data

Jan. 14, 1978 [DE] Fed. Rep. of Germany ....... 2801578
Jan. 17, 1978 [DE] Fed. Rep. of Germany ....... 2801792

[51] Int. Cl.$^2$ .............................................. C08G 65/20
[52] U.S. Cl. ................................... 528/408; 528/409; 528/417; 560/112
[58] Field of Search ............... 528/408, 409, 417; 560/112, 240; 568/617

[56] References Cited

U.S. PATENT DOCUMENTS

| | | | |
|---|---|---|---|
| 2,790,813 | 4/1957 | Bente | 260/346.1 |
| 2,856,370 | 10/1958 | Muetterties | 260/2 |
| 3,433,829 | 3/1969 | Dörfelt | 260/496 |
| 3,935,252 | 1/1976 | Tomomatsu | 260/346.1 |
| 4,127,513 | 11/1978 | Bellis | 528/413 |

FOREIGN PATENT DOCUMENTS 2461922  7/1976  Fed. Rep. of Germany .

*Primary Examiner*—Earl A. Nielsen
*Attorney, Agent, or Firm*—Keil & Witherspoon

[57] ABSTRACT

A process for the preparation of polybutylene glycol carboxylic acid diesters of the formula

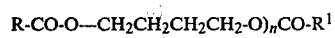

by polymerizing pretreated tetrahydrofuran in the presence of one or more carboxylic acids and/or carboxylic acid anhydrides and of a polymerization catalyst, especially antimony pentachloride or a bleaching earth containing less than 3% by weight of water, wherein the tetrahydrofuran is treated with a strong mineral acid, an organic sulfonic acid, silica gel and/or a bleaching earth prior to the polymerization.

10 Claims, No Drawings

POLYMERIZATION OF TETRAHYDROFURAN

The present invention relates to a process for the preparation of polybutylene glycol carboxylic acid diesters of the formula

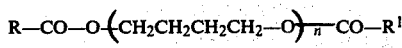

wherein tetrahydrofuran is treated with a strong mineral acid, an organic sulfonic acid, silica gel and/or a bleaching earth and is then polymerized in the presence of a conventional polymerization catalyst.

The polymerization of tetrahydrofuran (THF) catalyzed by oxonium ions has become generally known as a result of the fundamental work of H. Meerwein et al. (Angew. Chemie 72 (1960), 927).

The catalyst employed is either a compound formed beforehand, or a compound produced in situ. For example, the following trialkyloxonium salts, formed beforehand, are stated to act as catalysts:

$[(C_2H_5)_3O]SbCl_6$; $[(C_2H_5)_3O]BF_4$; $[(C_2H_5)_3O]FeCl_4$; $[(C_2H_5)_3O]AlCl_4$.

Suitable components which form oxonium ions in the reaction medium are, in particular, Lewis acids, eg. $BF_3$, $AlCl_3$, $SnCl_4$, $SbCl_5$, $FeCl_3$ and $PF_5$, which can be employed together with ethylene oxide, propylene oxide, epichlorohydrin, ortho-esters and acetals, α-chloroethers, benzyl chloride, triphenylmethyl chloride, acetyl chloride or β-propiolactone, as well as inorganic hydro-acids, eg. $HClO_4$, $HBF_4$, $HSO_3F$, $HSO_3Cl$, $H_2SnCl_6$, $HIO_3$, $HSbCl_6$ and $HFeCl_4$, which can be employed together with carboxylic acid anhydrides, carboxylic acid chlorides, $SOCl_2$, $POCl_3$ and benzenesulfonyl chloride, and, according to more recent publications, also aluminumalkyl compounds in combination with epichlorohydrin or water.

German Published Application DAS No. 1,226,560 describes the preparation of low molecular weight diacetates of dibutylene glycol and polybutylene glycols having a degree of polymerization of from 3 to at most 10 in the presence of a bleaching earth as the catalyst. Bleaching earths mentioned are aluminum hydrosilicates and aluminum/magnesium hydrosilicates of the montmorillonite type, which may be activated by an acid. The bleaching earths have the advantage, over catalyst systems of the oxonium ion type, that they are substantially less expensive and can be handled very easily. A further advantage of the bleaching earths which must not be underestimated is that they are toxicologically safe. By contrast, many of the catalyst systems which have been described and are actually used industrially must be regarded as hazardous and toxicologically unsafe.

It is clear from this list of conventional catalyst types, which in no way claims to be complete but only describes the most important systems hitherto disclosed, that there is a vast variety of catalysts by means of which tetrahydrofuran can be polymerized to polybutylene glycol, also referred to as polytetrahydrofuran (PTHF). Nevertheless, only a few catalysts have acquired industrial importance, because only with these is it possible to produce polymers which conform to market requirements in respect of their chemical and physical properties.

Hence, not even those skilled in the art can immediately select an optimum catalyst from those disclosed hitherto. The catalysts currently used industrially are derived from $BF_3$, $FSO_3H$, $HClO_4$ and oleum, with which olefin oxides, acetyl chloride, acetic anhydride and ketene may additionally be used as promoters. However, these processes in general have the shortcoming that the so-called catalysts do not act as catalysts in the strict sense but instead are employed in the stoichiometric ratio with regard to the resulting macromolecule. Accordingly, at least one catalyst molecule is consumed in producing one molecule of PTHF. For this reason, the manufacture of PTHF not only proves expensive but entails substantial pollution of the environment. For example, U.S. Pat. No. 3,358,042 discloses a process in which about 2 molecules of $HSO_3F$ must be employed as the catalyst per molecule of PTHF. Thereafter, the polymer first obtained must be worked up by hydrolysis, so as to convert it to a catalyst-free polyetherdiol. Following this hydrolysis, the catalyst passes quantitatively into the effluent water, as NaF and $Na_2SO_4$. From 30 to 40 parts of salt contaminant must be disposed of per 100 parts of polymer produced.

The use of bleaching earths as the catalyst, in accordance with German Published Application DAS No. 1,226,560, also entails environmental problems, since the amount of PTHF obtainable per unit amount of catalyst is limited. Thus, at most 40 parts of PTHF can be produced per part of bleaching earth, and even then relatively long reaction times must be accepted.

According to disclosures in German Patent Applications P 24 45 961.8 and P 26 24 286.4, THF can be polymerized in an environmentally non-polluting and inexpensive manner, and with high space-time yields, by using antimony pentachloride as the catalyst in the presence of one or more carboxylic acids and/or one or more carboxylic acid anhydrides, with or without the presence of an alcohol. The process described is at the same time capable of such broad variation that the molecular weight range required in industry, which in general is from 500 to 3,000, can be completely encompassed.

However, it is a disadvantage of the said process that if technical-grade THF is used as the starting material, the PTHF obtained is at times dark in color, and the desired molecular weights can only be reproduced with difficulty.

Technical-grade tetrahydrofuran contains small amounts of impurities, in concentrations of from 10 to 500 ppm. The chemical nature of these impurities is not known. Though this technical-grade tetrahydrofuran is of high purity—normally greater than 99.9%—the trace impurities may be responsible for the above difficulties during polymerization. On the other hand, color and reproducible constant molecular weight are important properties of a polymer intended for industrial use.

It is an object of the present invention to improve the polymerization of THF, especially technical-grade THF, in respect of permanent discoloration of the polymer, rate of polymerization and selection of molecular weight, i.e. to provide products which have a degree of polymerization n of from 2 to any desired higher value.

Accordingly, the present invention relates to a process for the preparation of polybutylene glycol carboxylic acid diesters of the formula

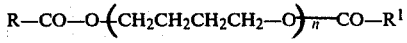

where R and $R^1$ are identical or different and each is alkyl, a carboxyl-containing aliphatic radical which may or may not be ethylenically unsaturated, or a carboxyl-containing aromatic radical and n is an integer from 2 to 200, by polymerizing tetrahydrofuran, wherein the tetrahydrofuran is treated, before polymerization, with a strong mineral acid, an organic sulfonic acid, silica gel and/or a bleaching earth and is then polymerized in the presence of one or more carboxylic acids and/or carboxylic acid anhydrides and a polymerization catalyst.

Since it is known to those skilled in the art that THF is most commonly prepared by dehydrating butane-1,4-diol in the presence of a strong mineral acid, the process according to the invention was surprising and unforeseeable. It could not be assumed that a renewed treatment with an acidic compound of the above type would result in an additional purification effect, in respect of the polymerization of THF.

The above treatment modifies the THF—without this modification being reliably demonstrable by analytical means—in such a way that the polymerization then takes place absolutely reproducibly. In particular, the products obtained have a color number of less than 10 APHA (according to DIN 53,409, July 1967) and their molecular weights are determined precisely by the parameters selected for carrying out the reaction. Since it is not known by what mechanism the treatment process occurs and what trace impurities are removed from the monomer, or are rendered innocuous, it is advantageous to employ the treatment of THF, according to the invention, in every case. The treatment can be carried out very simply and without great expense, so that it is advisable even in cases where it would not be absolutely essential to treat the technical-grade THF. If the pretreatment is omitted, faulty batches may be obtained, which cannot be used further, thereby entailing substantial financial loss.

The THF may be treated with strongly acidic compounds of the type of strong mineral acids, organic sulfonic acids, silica gel and bleaching earth. The acidic compounds may be used as such or as mixtures with one another. The use of bleaching earths is preferred.

Suitable strong mineral acids are those with a pKa of from about $-5$ to about $+4$, preferably from $-5$ to $+2$. Specific examples are strong mineral acids, eg. perchloric acid, hydrochloric acid, sulfuric acid and phosphoric acid, and organic sulfonic acids, eg. toluenesulfonic acid, as well as ion exchangers containing sulfonic acid groups.

Suitable silica gels are in particular the commercial types, such as are used for drying purposes or as catalyst carriers. Preferably, however, the process according to the invention is carried out with bleaching earths, eg. hydrated aluminum hydrosilicates of the montmorillonite groups, in which aluminum ions are replaced by iron or magnesium ions. These compounds are naturally occurring bleaching earths.

Only small amounts of the acidic compounds usable according to the invention are required for the treatment of the THF. Advantageous results are obtained by using the mineral acid, organic sulfonic acid, silica gel or bleaching earth in an amount of from 0.1 to 5, preferably from 0.5 to 3, % by weight, based on THF. Of course, the THF can also be treated with larger amounts but this offers no further advantage.

To carry out the treatment operation, the THF is intimately mixed with the acidic compound of the type described. The treatment time is from about 3 minutes to 12 hours. Preferably, it is confined to from 0.5 to 3 hours.

The treatment process may be carried out at room temperature or an elevated temperature, eg. at the boiling point of THF. Temperatures of from 10° to 66° C. are preferred.

After the THF has been treated with the mineral acid, organic sulfonic acid, silica gel and/or bleaching earth, the acidic material is preferably separated off again. The conventional physical methods of separation may be used for this purpose. A simple method is available if the treatment is carried out with a solid, for example a bleaching earth. In that case, it suffices merely to separate the solid from the THF by filtration or centrifuging. The treatment with solids can very easily be carried out continuously if the THF to be treated is passed over a fixed bed. If an acid which is soluble in THF is used for the treatment, the THF is subsequently advantageously separated off by distillation. The THF thus treated is of excellent purity and permits the reproducible manufacture of colorless PTHF.

The polymerization of the THF treated according to the invention is carried out in the conventional manner in the presence of a prior art catalyst. Polymerization catalysts for THF which are particularly suitable and are therefore used preferentially are antimony pentachloride in the presence of one or more carboxylic acids and/or carboxylic acid anhydrides, with or without the presence of an alcohol, in accordance with German Patent Applications P 24 45 961.8 and P 26 24 286.4, and bleaching earths, especially bleaching earths containing less than 3% by weight of water, in the presence of one or more carboxylic acid anhydrides.

Bleaching earths and fuller's earths belong, crystallographically, to the montmorillonites. These are colloidal hydrated aluminum hydrosilicates which occur naturally and in which aluminum ions may be partially replaced by iron or magnesium. The ratio of silica to the oxides of divalent and trivalent metals in these minerals is in most cases 4:1. The commercial products, which are mostly activated by acid treatment and contain from 4 to 8% by weight of water, based on the total weight, are extensively used as catalysts, for refining edible oils, fats and mineral oils, as adsorbents and as fillers.

For the conventional fields of application, bleaching earths, in accordance with the manufacturers' recommendations, display their maximum activity if used in their commercial hydrated form. It was therefore surprising that in the case of the polymerization of THF substantially better results are obtained if instead of the commercial hydrated minerals, anhydrous or, in particular, substantially anhydrous bleaching earth is used as the catalyst. Anhydrous bleaching earths exhibit greater catalytic activity in respect of the rate of polymerization, the achievable conversion and the amount of catalyst which has to be employed. It is a further advantage that using the substantially anhydrous bleaching earths, the degree of polymerization of the polybutylene glycol carboxylic acid diesters, especially polybutylene glycol diacetates, obtained can be selected to have any value from $n=2$ upward, depending on the reaction conditions. The polymerization process according to the invention may be used to prepare diesters of polybutylene glycols having degrees of polymerization of from $n=2$ to $n=200$, preferably from $n=5$ to $n=50$, especially from $n=12$ to $n=36$, i.e. polymers which after hydrolysis give hydroxyl-containing PTHF having a molecular weight of from about 150 to 15,000, preferably from 400 to 4,000, and especially from 1,000 to 3,000. PTHF having these high molecular weights is required to give a sufficiently high level of mechanical properties in the end product, for example when manufacturing polyurethanes. The use of PTHF with a molecular weight of less than 500 is in every case confined to the solution of specific problems.

A further advantage of the polymerization of THF with bleaching earth, particularly with bleaching earths containing less than 3% by weight of water, is that, unlike the conventional processes, the catalyst is not present in solution in the reaction product and does not have to be removed by an expensive method entailing laborious washing and precipitation processes, but can instead be isolated by conventional physical methods of separation, eg. filtration or centrifuging. Surprisingly, we have found that the substantially anhydrous bleaching earths separated off can be re-used for an unlimited number of further polymerizations. Thus, up to 1,000 parts, or even more, of polybutyleneglycol diester can be produced without difficulty per part of substantially anhydrous bleaching earth, when using the process according to the invention.

In contrast to the conventional quasi-catalytic polymerization processes, the polymerization with bleaching earth containing less than 3% by weight of water must be regarded as a genuine case of catalysis, since the catalyst can be re-used as often as desired. By contrast, when using commercial hydrated bleaching earths, the activity of the latter very rapidly decreases each time the bleaching earth is re-used, so that it is not economically justifiable to re-use the catalyst which has been separated off for further polymerizations. This demonstrates the environmentally non-polluting character of the novel polymerization process and the substantial technical advance achieved by the process, since it is not necessary to cope with, and dump, substantial amounts of salts.

Suitable bleaching earths are, in particular, aluminum hydrosilicates and aluminum/magnesium hydrosilicates of the montmorillonite type, which can be activated with acid and are commercially available, for example under the name "Tonsil". To produce the substantially anhydrous bleaching earths, commercial hydrated bleaching earths are dehydrated at from 100° to 200° C., preferably from 110° to 150° C., in from 1 to 8 hours, preferably from 2 to 4 hours, under atmospheric pressure or, preferably, under reduced pressure. The substantially anhydrous bleaching earths which may be used as catalysts contain less than 3% by weight of water, preferably from 0.001 to 1.5% by weight, and especially from 0.1 to 1.0% by weight. Only small amounts of the substantially anhydrous bleaching earths are required for the polymerization of THF. Advantageous results are achieved if the bleaching earths are employed in an amount of from 1 to 20% by weight, preferably from 5 to 10% by weight, based on the total polymerization batch. Of course, larger or smaller amounts may also be used. The amount has hardly any effect on the properties of the polymers obtained. It only affects the rate of reaction, which as a first approximation is directly proportional to the amount of catalyst used.

The substantially anhydrous bleaching earths only become catalytically active in the presence of the carboxylic acid anhydride promoter. It is advantageous to use carboxylic acid anhydrides derived from aliphatic or aromatic polycarboxylic acids and/or, preferably, monocarboxylic acids of 2 to 12, preferably of 2 to 8, carbon atoms. Examples include anhydrides of aliphatic carboxylic acids of 2 to 12 carbon atoms, eg. butyric anhydride, valeric anhydride, caproic anhydride, caprylic anhydride, pelargonic anhydride and, preferably, propionic anhydride and acetic anhydride, and anhydrides of aromatic and aliphatic polycarboxylic acids, especially dicarboxylic acids, eg. phthalic anhydride, naphthalic anhydride and, preferably, succinic anhydride and maleic anhydride. For reasons of cost and of ready availability, acetic anhydride is preferred. Of course, mixed anhydrides, and mixtures of the above anhydrides, may also be used.

When using antimony pentachloride in the presence of one or more carboxylic acids and/or carboxylic acid anhydrides as the polymerization catalyst, one can also use the carboxylic acids of the abovementioned carboxylic acid anhydrides as promotors instead of the anhydrides.

As already mentioned, diesters of polybutylene glycol having any desired degree of polymerization can be prepared by the process according to the invention. The degree of polymerization is essentially determined by the carboxylic acid anhydride concentration of the polymerization batch. The lower the said concentration, the higher is the molecular weight obtained, and vice versa. Since the degree of polymerization is also determined by the properties of the substantially anhydrous bleaching earths, it is in general necessary to determine, for any given bleaching earth, the acid anhydride concentration which gives the desired molecular weight. Since the nature of the substantially anhydrous bleaching earth used has less effect on the molecular weight than has the carboxylic acid anhydride concentration, the following values may for example be mentioned as a guideline for the effect of the latter. At a carboxylic acid anhydride concentration of, for example, from 70 to 80 mole percent, the THF is virtually quantitatively converted to the diester of dibutylene glycol at a polymerization temperature of from 30° to 40° C. If a carboxylic acid anhydride concentration of about 3 mole percent is used, the polymer obtained has a degree of polymerization n of from 25 to 30.

To prepare diesters of polybutylene glycols with degrees of polymerization of from 12 to 36 at, for example, 30° C. (such products being in particular prepared for the purpose of hydrolysis to PTHF which is subsequently used for the manufacture of polyurethanes), it has proved particulary advantageous to use a carboxylic acid anhydride concentration, especially an acetic anhydride concentration, of from 12 to 0.5 mole percent, preferably from 9 to 1.5 mole percent, and therefore the polymerization is preferably carried out with this concentration range.

Polymerization is in general carried out at from 0° C. to 70° C. Since, on the one hand, the rate of reaction very greatly decreases below 20° C., whilst on the other hand the conversion becomes low above 60° C., the polymerization is preferably carried out at from 20° to 50° C. The polymerization times are from about 1 to 20 hours, preferably from 2 to 10 hours, depending on the temperature and catalyst concentration empolyed.

After the polymerization has taken place, the reaction is stopped by removing the catalyst. This may be effected by means of the conventional physical methods of separation, for example by filtration or centrifuging. The reaction solutions obtained still contain, in addition to the polybutylene glycol diesters, from 0 to 50% by weight (depending on the reaction conditions used), based on the total weight of the reaction solution, of unconverted THF. Since, apart from the polybutylene glycol diester, the reaction solution obtained contains only volatile constituents, namely carboxylic acid anhydride and unconverted THF, it suffices to remove these constituents by distillation, if appropriate under reduced pressure.

The substantially anhydrous bleaching earths separated off can be re-used as catalysts without a further pretreatment.

The polybutylene glycols obtained by the process according to the invention, which contain carboxylic acid radicals as end groups, can be converted to the corresponding dihydroxy compounds in the conventional manner by transesterification, for example with methanol, in accordance with U.S. Pat. No. 2,499,725 and with J. Amer. Chem. Soc., 70, 1842.

The polytetrahydrofuran thus obtained, which preferably has a molecular weight of from about 1,000 to 3,000, is outstandingly suitable for the manufacture of polyurethanes, especially polyurethane elastomers, casting resins and the like.

The Examples which follow illustrate the process according to the invention without implying a limitation. Parts are by weight and bear the same relation to parts by volume as that of the kilogram to the liter.

EXAMPLE 1

(a) Treatment of the THF

A commercial technical-grade tetrahydrofuran has the following composition according to gas-chromatographic analysis (3 m glass column, Triton X 305, 50°–200° C.):

| Retention time, sec. | 0–90 | 106 | 149 | 149–505 | 505 |
|---|---|---|---|---|---|
| Area percent | 0.01 | 99.8 | 0.04 | 0.03 | 0.02 |

0.5% by weight of a commercial bleaching earth, Tonsil Optimum FF ® (from Süd-Chemie AG, Munich) is added to this tetrahydrofuran, which is then refluxed for 2 hours. The volatiles are then distilled off. The purified tetrahydrofuran thus obtained gives the following results on gaschromatographic analysis, which differ only little from the values given above:

| Retention time, sec. | 0–90 | 106 | 149 | 149–505 | 505 |
|---|---|---|---|---|---|
| Area percent | 0.01 | 99.8 | 0.05 | 0.03 | 0.02 |

The same result is obtained if any of the following are used, instead of the Tonsil Optimum FF bleaching earth, for the treatment of the THF:
2% by weight of $Al_2(OH)_2.Si_4O_{10}$ (bentonite from Süd-Chemie, Munich),
0.5% by weight of p-toluenesulfonic acid,
0.5% by weight of sulfuric acid or
0.5% by weight of commercial silica gel granules (silica gel A from BASF Aktiengesellschaft).

(b) Polymerization of the treated THF

A solution of the acetic acid/antimony pentachloride catalyst is prepared by mixing 149 parts of antimony pentachloride with 60 parts of acetic acid at 50° C., whilst cooling.

2,160 parts of THF, treated with Tonsil Optimum FF as described under (a), are heated to 30° C. and 357 parts of acetic anhydride and 5 parts of the catalyst solution are added successively. After a polymerization time of 6 hours at 30° C., the reaction is stopped by adding 3 parts of calcium hydroxide. Suspended hydroxide, with antimony catalyst bonded thereto, is then removed from the reaction product by pressure filtration. Thereafter, unconverted tetrahydrofuran and acetic anhydride are removed from the clear polymer solution at 100° C. under reduced pressure. The product is then filtered again. 1,600 parts of a polytetrahydrofuran containing acetyl groups and having a molecular weight of about 2,000 are obtained. The color number of the molten product is less than 10 APHA units. The tetrahydrofuran recovered from the polymer by distillation can be re-used for further polymerizations, without any additional treatment.

EXAMPLE 2

2,160 parts of THF, treated with Tonsil Optimum FF as described under Example 1 (a) are heated to 30° C., and 357 parts of acetic anhydride and 50.3 parts of bleaching earth (Tonsil Optimum FF) are added successively to act as the polymerization catalyst. After a polymerization time of 6 hours at 30° C., the bleaching earth is filtered off and the unconverted THF and acetic anhydride are distilled from the polymer solution at 100° C. under reduced pressure. 850 parts of a polytetrahydrofuran containing acetyl groups and having a molecular weight of 1,670 are obtained.

EXAMPLE 3

The procedure followed is as described in Example 2, but instead of Tonsil Optimum FF bleaching earth, the commercial montmorillonite catalysts from Süd-Chemie, Munich, namely catalyst K 10, catalyst K SF and catalyst KP 10, are used as the catalyst; polymers having a molecular weight of 2,000 and with color numbers of about 10 APHA units are obtained.

COMPARATIVE EXAMPLE A

The procedure described in Example 1 (b) is followed, but technical-grade THF which has not been treated according to the invention is used as the monomer. 1,250 parts of a PTHF containing acetyl groups and having a molecular weight of 2,600 are obtained, the color number of the molten product being about 160 APHA units.

COMPARATIVE EXAMPLE B 2,160 parts of untreated technical-grade THF are mixed with 357 parts of acetic anhydride and polymerized for 6 hours at 30° C. in the presence of 50.3 parts of Tonsil Optimum FF (from Süd-Chemie, Munich). The bleaching earth is then filtered off and the uncovered THF and acetic anhydride are distilled from the polymer solution at 100° C. under reduced pressure. 510 parts of a PTHF containing acetyl groups, which has a molecular weight of 1,865 and a color number of about 140 APHA units, are obtained.

COMPARATIVE EXAMPLE C

The procedure followed is as described in Comparative Example B, but the quantity of Tonsil Optimum FF is increased by the amount which in the previous case was used to purity the THF (0.5% by weight, based on the amount of THF to be polymerized), and commercial THF which has not been treated according to the invention is used. 670 parts of a PTHF which contains acetyl groups and has a molecular weight of 1,740 and a color number of about 160 APHA units are obtained.

A comparison with the Example carried out according to the invention shows that the treatment of the THF according to the invention substantially increases the conversion achieved on subsequent polymerization, and greatly lowers the color numbers.

EXAMPLE 4

A mixture of 2,160 parts of tetrahydrofuran and 102 parts of acetic anhydride is heated to 40° C. in a stirred vessel, and 226 parts of a commercial bleaching earth (® Tonsil Optimum FF, from Süd-Chemie AG, Munich), the water content of which has been reduced to 0.01% by weight by drying at 130° C. for 8 hours, are added. An exothermic reaction commences immediately, and the temperature is kept at 40° C. by cooling. The conversion is 58% by weight after only 2 hours. The catalyst is filtered off. After distilling the unconverted THF from the colorless reaction solution, a colorless polybutylene glycol diacetate having a molecular weight of 1,900 (calculated from the saponification number) is obtained.

If Tonsil Optimum extra (mex) bleaching earth, from Süd-Chemie, Munich, is used, the conversion is 60% and the polymer has a molecular weight of 2,300.

A polymerization, carried out under the same experimental conditions, with "VMP 24/48" bleaching earth from Mid-Florida Mining Company, U.S.A., the water content of which had been reduced from 5% to 0.06% by drying at 110° C. and 30 mm Hg for 8 hours, gave a polymerization conversion of 41%, and the polymer had a molecular weight of 3,000.

EXAMPLE 5

The procedure followed is as described in Example 4, but instead of 102 parts 306 parts of acetic anhydride are used. After 8 hours, a polymerization conversion of 73% is achieved. The polymer obtained has a molecular weight of 750 (determined from the saponification number).

EXAMPLE 6

The procedure followed is as described in Example 4 and 2,160 parts of tetrahydrofuran are polymerized with 102 parts of acetic anhydride in the presence of 226 parts of Tonsil Optimum FF, the water content of which has beforehand been reduced to less than 0.1% by drying at 115° C. for 24 hours. The result achieved is as in Example 4.

The catalyst separated off is used a second time for the polymerization of 2,160 parts of tetrhydrofuran with 102 parts of acetic anhydride at 40° C. The result achieved does not differ from that of the first polymerization experiment. The result of the experiment remains constant even if the catalyst is re-used 20 times under identical reaction conditions.

COMPARATIVE EXAMPLE D

A mixture of 2,160 parts of untreated technicalgrade tetrahydrofuran and 102 parts of acetic anhydride is heated to 40° C. in a stirred vessel and is polymerized in the presence of 226 parts of a commercial bleaching earth (Tonsil Optimum FF from Süd-Chemie, Munich), which contains 5% by weight of water, based on total weight. After a polymerization time of 2 hours, a degree of conversion of the tetrahydrofuran of 21% by weight is reached. The molecular weight of the polytetrahydrofuran diacetate obtained is 2,500. Even after a polymerization time of 32 hours the degree of conversion is only 24% by weight, whilst the molecular weight of the polytetrahydrofuran diacetate obtained is 2,450.

If the same commercial bleaching earth, with a water content of 6.3% by weight, based on total weight, is used as the polymerization catalyst, a polymer having a molecular weight of 2,900 is obtained after a polymerization time of 32 hours, the degree of conversion being 19% by weight.

If the catalyst is isolated from the polymerization batches by filtration and re-used for the polymerization, the second reaction gives a degree of conversion of 15% by weight and a molecular weight of the polymer of 3,100.

The Comparative Examples show that commercial bleaching earths which have not been pretreated and have a water content greater than 3% by weight, based on total weight, possess a lower catalytic activity and give polymerization results of poor reproducibility.

EXAMPLE 7

A commercial bleaching earth (® Tonsil Optimum FF from Süd-Chemie AG, Munich) is dried to constant weight at 150° C. This lowers the water content from 3.5% by weight to less than 0.01% by weight.

1% by weight of the above dried bleaching earth is added to the technical-grade THF described in Example 1, and the mixture is refluxed for half an hour. The bleaching earth is then filtered off. 4,320 parts of the THF which has thus been purified are heated to 40° C. in a stirred vessel and 408 parts of acetic anhydride and 453 parts of the above dried bleaching earth are added successively. After a polymerization time of 8 hours at 40° C., the bleaching earth is filtered off and the uncovered tetrahydrofuran and acetic anhydride are distilled from the polymer solution at 100° C. under reduced pressure. The residue obtained consists of 3,000 parts of polytetrahydrofuran which contains acetyl groups and has a molecular weight of 1,000. The polymer has a color number of less than 10 APHA units.

The polymer can be converted by hydrolyis into polybutylene glycol which has corresponding properties and can be used as the diol component in the manufacture of polyurethane resins.

We claim:

1. A process for the preparation of polybutylene glycol carboxylic acid diesters of the formula

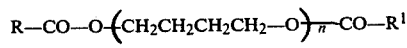

where R and $R^1$ are identical or different and each is alkyl, a carboxyl-containing aliphatic radical which may or may not be ethylenically unsaturated, or a carboxyl-containing aromatic radical and n is an integer from 2 to 200, by polymerizing tetrahydrofuran, wherein the tetrahydrofuran, after removal of the catalyst used in the preparation of the tetrahydrofuran, is treated, before polymerization, with a strong mineral acid, an organic sulfonic acid, silica gel and/or a bleaching earth and is then polymerized in the presence of one or more carboxylic acids and/or carboxylic acid anhydrides and a polymerization catalyst.

2. A process as claimed in claim 1, wherein the strong mineral acid, organic sulfonic acid, silica gel and/or bleaching earth used to treat the tetrahydrofuran is separated off again before carrying out the polymerization.

3. A process as claimed in claim 1 or 2, wherein the strong mineral acid, organic sulfonic acid, silica gel and/or bleaching earth is used in an amount of from 0.1 to 3% by weight, based on tetrahydrofuran.

4. A process as claimed in claim 1, wherein the treatment time is from 0.5 to 3 hours.

5. A process as claimed in claim 1, wherein the treatment temperature is from 10° to 66° C.

6. A process as claimed in claim 1, wherein antimony pentachloride or bleaching earth containing less than 3% by weight of water is used as the polymerization catalyst for polymerizing the pretreated tetrahydrofuran.

7. A process as claimed in claim 1, wherein acetic anhydride is used as the carboxylic acid anhydride.

8. A process as claimed in claim 6, wherein the bleaching earth contains from 0.001 to 1.5% by weight of water.

9. A process as claimed in claim 6, wherein the bleaching earth is used in an amount of from 1 to 20% by weight, based on tetrahydrofuran.

10. A process as claimed in claim 6, wherein the bleaching earth used as the catalyst is separated from the reaction mixture after completion of the polymerization, and is re-used as a polymerization catalyst.

* * * * *